United States Patent [19]

Canter

[11] 4,285,584
[45] Aug. 25, 1981

[54] PHOTOMETRIC DEVICE

[75] Inventor: Joseph M. Canter, Lexington, Mass.

[73] Assignee: Polaroid Corporation, Cambridge, Mass.

[21] Appl. No.: 81,207

[22] Filed: Oct. 2, 1979

[51] Int. Cl.³ ............................................. G03B 7/083
[52] U.S. Cl. .................................... 354/31; 354/38; 354/50; 356/222; 250/214 P
[58] Field of Search ............... 354/31, 33, 38, 48, 354/49, 50, 51; 250/209, 214 P; 355/68; 356/222, 226

[56] References Cited

U.S. PATENT DOCUMENTS

| Re. 28,025 | 5/1974 | Murata et al. | 315/151 |
|---|---|---|---|
| 3,310,679 | 3/1967 | Babish | 250/209 |
| 3,448,274 | 6/1969 | Altman | 250/209 |
| 3,511,142 | 5/1970 | Biber | 95/10 |
| 3,529,523 | 9/1970 | Haskell | 95/10 |
| 3,545,350 | 12/1970 | Gross | 95/10 |
| 3,563,143 | 2/1971 | Petersen | 95/10 |
| 3,708,676 | 1/1973 | Huboi et al. | 355/68 X |
| 3,714,442 | 1/1973 | Frank | 250/209 |
| 3,717,077 | 2/1973 | Harvey | 95/10 CE |
| 3,741,088 | 6/1973 | Nobusawa | 95/10 CT |
| 3,772,517 | 11/1973 | Smith | 250/209 |
| 3,797,941 | 3/1974 | Staes et al. | 356/175 |
| 3,836,920 | 9/1974 | Uchiyama et al. | 354/27 |
| 3,855,601 | 12/1974 | Uchiyama et al. | 354/31 |
| 3,884,584 | 5/1975 | Tsunekawa et al. | 356/226 |
| 3,945,732 | 3/1976 | Nobusawa | 356/222 |
| 3,971,046 | 7/1976 | Nobusawa | 354/24 |
| 4,005,444 | 1/1977 | Uchiyama et al. | 354/27 |
| 4,162,426 | 7/1979 | Tsunekawa | 354/31 X |
| 4,162,831 | 7/1979 | Gold | 354/31 |

OTHER PUBLICATIONS

"The Theory of the Multicell Exposure Meter", R. Euling, Photographic Science and Engineering, vol. 6, No. 3, May–Jun. 1962, pp. 121–129.

Primary Examiner—L. T. Hix
Assistant Examiner—Stafford D. Schreyer
Attorney, Agent, or Firm—Edward S. Roman

[57] ABSTRACT

A photometer for use in combination with a camera determines the optimum film exposure interval with the exposure interval corrected for differences in illuminance between a subject of principal interest in the central portion of the scene to be photographed and the subjects of secondary interest in the foreground and background portions of the scene. The photometer includes a photo-responsive array divided into three light receiving segments each having a field of view that generally corresponds to, respectively, the central portion, the foreground portion, and the background portion of the scene. Electronic circuitry, either in analog or digital form, is provided to select the maximum output of the background and foreground segments of the photo responsive array and compare the so-selected maximum output with the output of the central segment to increase the exposure interval when either the background or the foreground portion of the scene are more brightly illuminated than the subject of principal interest and decrease the exposure interval when the background or foreground portion of the scene are less brightly illuminated than the subject of principal interest. A photometer in accordance with the present invention is suitable for use with both conventional shutter mechanisms and time-integrating shutters.

33 Claims, 8 Drawing Figures

PHOTOMETRIC DEVICE

BACKGROUND OF THE INVENTION

The present invention relates to photometric devices and, more particularly, to photometric devices for determining the optimum film exposure interval for a camera in which the exposure interval is corrected for differences in illuminance between the subject of principal interest in the central portion of the scene to be photographed and the subjects of secondary interest in the foreground and background portions of the scene.

Various types of single-cell and multi-cell photometers have been developed to measure the light reflected from a scene to be photographed to compute or otherwise determine the film exposure interval for the camera.

The simplest photometers generally include a single photo-responsive cell that has a field of view approximately the same as that of the camera. The cell provides an electrical output responsive to the average light reflected from the entire scene to be photographed. While this type of photocell arrangement generally provides accurately determined exposure intervals for a narrow range of illumination, the accuracy of the exposure determination decreases as the range of brightness or illumination over the scene increases. For example, the exposure determination derived from a single-cell averaging photometer can be adversely affected by a bright source of light occupying a relatively small area of the scene such as a small, but bright lamp in the foreground portion of an interior scene. In order to overcome this type of disadvantage, single-cell spot meters, which have a field of view covering a fraction of the total scene area, have been developed to permit the exposure determination to be made for the subject of primary interest while generally ignoring the foreground and background portions of the scene. The use of a spot meter, however, requires that the photographer be sufficiently skilled to accurately aim the spot meter at the subject of principal interest, and, when photographing a scene without a subject of primary interest, e.g., a long distance landscape scene, to manually scan the scene to ascertain the maximum and minimum brightnesses to estimate an acceptable average film exposure interval.

Various types of multi-cell photometers have been developed in an effort to increase the accuracy of the film exposure interval determination over a wide range of scene illumination. In some of these multi-cell photometers, the individual cells are arranged in an ordered array of rows and columns occupying a field of view equivalent to that of the camera with the individual outputs of the cells electronically evaluated to determine the maximum and minimum brightness and to provide an exposure determination based on these outputs. In yet more sophisticated photometers, the cells are arranged having a central portion that coincides with the probable subject of principal interest in the central portion of the scene and a peripheral portion that surrounds the central portion, for example, as disclosed in U.S. Pat. Nos. 4,005,444; 3,884,584; and 3,836,920.

As photometric devices have become more sophisticated, the amount of electronic circuitry necessary to determine the exposure interval has increased dramatically, and, as a practical result, sophisticated photometric devices for use with contemporary cameras are relatively complex electronic devices requiring extensive electronic circuitry. The cost of these sophisticated photometers is such that their use is generally restricted to more expensive cameras rather than inexpensive cameras intended for the mass consumer market.

SUMMARY OF THE INVENTION

A photometer in accordance with the present invention for determining the exposure interval for a camera is provided with a photo-responsive means that is divided into a first photo-responsive segment adapted to receive light from the foreground portion of the scene to be photographed, a second photo-responsive segment adapted to receive light from the background portion of the scene, and a third photo-responsive segment adapted to receive light from a subject of principal interest in a central portion of the scene with the three photo-responsive segments each adapted to provide an electrical output responsive to the light received from their respective portions of the scene. Electronic means coupled to the photo-responsive segments determines and selects the brighter of the background and the foreground segments and compares the signal output of the so-selected segment with the output of the central segment to determine the corrected film exposure interval for the camera. The electronic means can include analog circuitry which effects both the comparison and correction functions or digital circuitry which converts the analog outputs of the three photo-responsive segments into a digital form and then effects the comparison and correction in a digital manner. A photometer in accordance with the present invention is adapted for use in cameras where the film exposure interval determination is made prior to operation of the shutter and for use in cameras having time-integrating shutters in which the film exposure interval determination is made concurrent with the operation of the shutter.

A photometer in accordance with the present invention advantageously corrects the film exposure interval by selectively increasing the exposure when the subjects of secondary interest in either the background or the foreground portions of the scene are more brightly illuminated than the subject of principal interest to provide improved rendition of the subject and selectively decreasing the exposure when the subject of principal interest in the central portion of the scene is more brightly illuminated than the subjects of secondary interest in either the background or foreground to prevent over-exposure of the subject.

The principal object of the present invention is to provide a photometer for a camera that advantageously corrects the film exposure interval for the subject of principal interest in the central portion of the scene relative to the illumination of the subjects of secondary interest in the background or foreground portions of the scene. Other objects of the present invention include providing a photometer that is compatible with cameras having integrating shutters in which the exposure determination is made concurrently with the film exposure and cameras in which the exposure determination and exposure setting is made prior to the triggering of the shutter and providing a photo-meter that is suited for use with inexpensive cameras.

BRIEF DESCRIPTION OF THE PREFERRED EMBODIMENT

Figure 1:
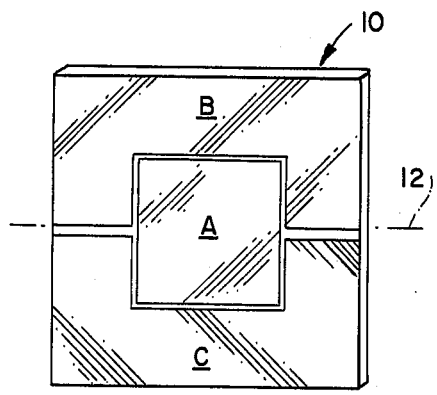
FIG. 1 is a frontal perspective view of a photo-responsive array in accordance with the present invention which corresponds to the field of view of the scene to be photographed and includes a central portion for receiving light from the subject of principal interest and background and foreground portions for receiving light from the subjects of secondary interest.

A photometer in accordance with the present invention utilizes a photometric array 10 that includes a plurality of photo-responsive segments having the arrangement shown in FIG. 1. As shown therein, the array 10 includes a generally rectangular central segment A and upper and lower segments B and C that bracket the central segment A. The upper segment B encloses or circumscribes an area above the central segment A and extends outwardly from both sides of the central segment A and downwardly to a median line 12 with the lower segment C symmetrically formed relative to the upper segment B, that is, the lower segment C encloses or circumscribes an area below the central segment A and extends outwardly from both sides of the central segment A and upwardly to the median line 12.

In the preferred embodiment, the field of view of the entire photometric array 10 generally corresponds to that of the scene to be photographed with the field of view subtended by the central segment A preferably occupying 25% of the total field of view of the scene and positioned to substantially correspond with and receive the light reflected from the probable subject of principal interest in the central portion of the scene. The upper and lower segments, B and C, each subtend approximately $37\frac{1}{2}\%$ of the remaining field of view with the segments B and C being positioned to receive the light reflected, respectively, from the subjects of secondary interest in the background and foreground portions of the scene to be photographed.

The photometric array 10 may be formed from any one of a number of materials that change their electrical characteristics or are otherwise responsive to the amount of incident light including photoconductive cells and photo-voltaic cells such as various types of photodiodes. In the preferred embodiment, the photometric array 10 is formed as photo-responsive diode junctions on a substantially planar, unitary substrate with the various segments deposited or otherwise formed in place. In the alternative, the photometric array 10 can be formed from discrete elements that are located relative to one another to form the desired photometric array.

The photometric array 10 is adapted to be used in combination with circuitry described below to provide a film exposure indication or setting for both those cameras in which the photometric measurement is made prior to the initiation of the exposure interval and in those cameras having integrating type shutters in which the film exposure interval determination is made during the exposure cycle on a real time basis. An example of an integrating shutter is disclosed in U.S. Pat. No. 4,008,481 to Whiteside assigned to the assignee of the present invention. The integrating shutter disclosed therein includes overlapping shutter blades that have shaped, complementary openings for both a film exposing aperture (the camera lens) and an averaging photocell aperture. When the exposure interval is initiated, the overlapping blades move relative to one another under the influence of a spring to progressively enlarge the apertures over the camera lens and the averaging photocell. When the photocell and its associated circuitry determine that the total amount of light energy incident on the film is sufficient to provide proper exposure a shutter close signal is issued to close the shutter and to terminate the exposure interval.

Figure 2:
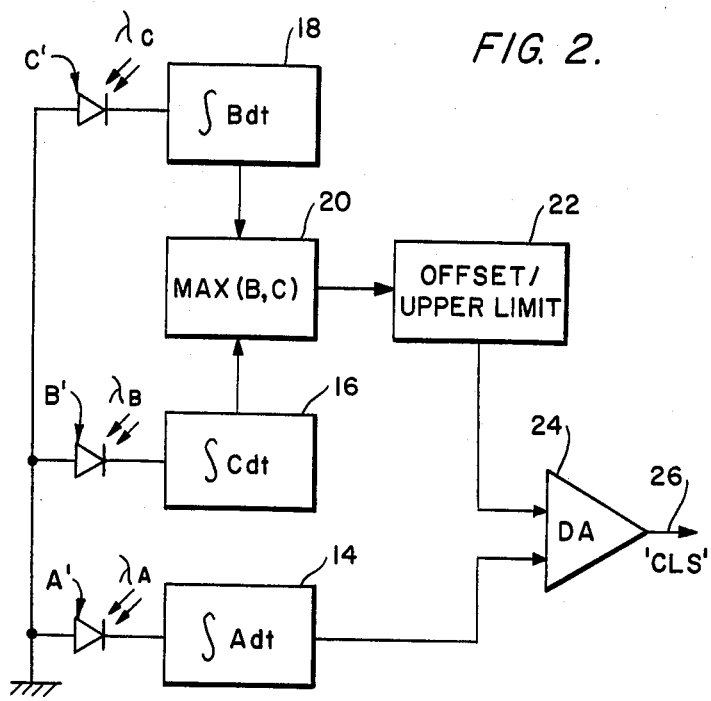
FIG. 2 is a schematic block diagram of an analog exposure interval determining circuit adapted to operate in cooperation with the photo-responsive array of FIG. 1.

The photometric array 10 may be used in combination with the analog circuitry of FIG. 2 to provide a film exposure determination in a camera having the above referenced integrating type shutter that is more accurate over a wider range of brightnesses than the film exposure determination provided solely by the aforementioned averaging photocell. In an application of this type, the photometric array 10 is mounted on the camera and oriented behind a lens in such a manner that its field of view is substantially equal to that of the camera so that the central segment A receives the light reflected from the subject of principal interest in the central portion of the scene to be photographed and the upper and lower segments B and C receive the light reflected from, respectively, the background and foreground portions of the scene.

In FIG. 2, the photo-diodes A', B', and C' correspond, respectively, to the central, background, and foreground segments A, B, and C of the photometric array 10 of FIG. 1 with the light incident upon the segments represented by the symbols $\lambda A$, $\lambda B$ and $\lambda C$, respectively. The anodes of the diodes A', B', C', are connected in common to a circuit ground, and the cathodes are connected, respectively, to integrators 14, 16, and 18. Each of the integrators, 14, 16, and 18, is adapted to provide a time increasing voltage output in response to the input signal provided from their respective photodiode with the rate of increase dependent upon the illumination incident on the diode. The operating characteristics of the integrators 14, 16, and 18 are adjusted such that their outputs are substantially the same for the same average illumination received by their respective photo-diodes. In the preferred embodiment, each of the integrator circuits is fabricated from a linear operational amplifier having a capacitive impedence in its feedback circuit to provide an output which is proportional to the time intergal of its input signal.

Since the area of the scene subtended by the central portion A (25%) is less than that subtended by the background and foreground portions B and C ($37\frac{1}{2}$% each), the adjustment of the integrators 14, 16 and 18 to provide equal output for the same average luminance has the effect of center-weighing the photometric array 10. While this center-weighted aspect is preferred, it can be eliminated or modified by appropriate adjustment of the operating characteristics of the integrator 14.

A comparator circuit 20 is connected to the outputs of the integrators 16 and 18 and is adapted to select the greater of its two input signals, that is, MAX (B, C). A trim circuit 22 is connected to the output of the comparator circuit 20 and modifies the so-selected MAX (B, C), as explained in relation to FIGS. 3A to 3C, to introduce an arbitrarily selected voltage offset and an upper voltage limit.

The output of the trim circuit 22 and the output of the integrator 14, which represents the signal output of the central segment A of the photometric array 10, are connected to the inputs of a differential amplifier 24 which is designed to change its output polarity on line 26 when any one of the two inputs increases to a value exceeding the other input. This change in output polarity on line 26 is used by appropriate circuitry (not shown) to provide a shutter close command signal 'CLS' to close the shutter and complete the film exposure interval.

The circuit shown in FIG. 2 in cooperation with the photometric array 10 of FIG. 1 is adapted to increase or lengthen the film exposure interval when the subjects of secondary interest in the background portion or the foreground portion of the scene to be photographed are relatively brighter than the subject of primary interest in the central portion and to shorten or decrease the film exposure interval when the subject of primary interest in the central portion of the scene is relatively brighter than the subjects of secondary interest in the background or foreground of the scene. The operation of the circuitry of FIG. 2 and the photometric array 10 of FIG. 1 can be seen from a comparison of the idealized graphical illustrations of FIGS. 3A, 3B, and 3C in which the abscissas in each figure represent time and the ordinates represent signal voltage in arbitrary units.

Figure 3A:
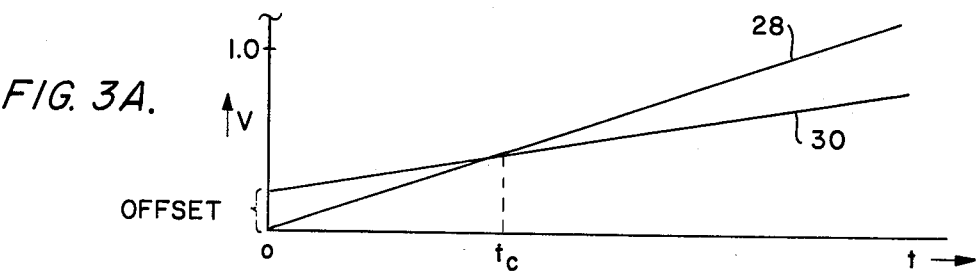
FIG. 3A is an idealized graphical illustration of the response characteristics of the film exposure interval determining circuit of FIG. 2 and the photo-responsive array of FIG. 1 when the illumination of the subject of principal interest in the central portion of the scene is approximately equal to the illumination of the subjects of secondary interest in the background and foreground portions of the scene in which the ordinate represents voltage in arbitrary units and the abscissa represents time.

FIG. 3A illustrates the operation of the photometric array 10 of FIG. 1 and the circuitry of FIG. 2 when the subject of primary interest in the central portion of the scene to be photographed and the subjects of secondary interest in the background or foreground portion are illuminated with approximately the same intensity or illuminance. In FIG. 3A, plot 28 represents the output of the integrator 14 which output is proportional to the output of the central segment A of the photometric array 10, and plot 30 represents the output of the trim circuit 22, that is, MAX (B, C) with the plot 30 initiating at a point offset from the abscissa and increasing at a rate less than that of the plot 28. When the shutter command button is operated to initiate the film exposure interval at time T=0, each photodiode A', B', and C' provides an output to its respective integrator 14, 16, and 18. The output of integrator 14, which is proportional to the average light reflected from the subject of principal interest in the central portion of the scene, increases in a linear manner as indicated by the plot 28. Similarly, the outputs of the integrators 16 and 18, representing the average light reflected from the subjects of secondary interest in the background and foreground portions of the scene, also increase in a linear manner with the greater of these two outputs selected by the comparator 20 and provided with an offset by the trim circuit 22 as indicated by the plot 30 in FIG. 3A. The plots 28 and 30, which represent the signal inputs to the differential amplifier 24, increase at different rates with increasing time and when the two plots intersect at time $T=T_c$ the output of the integrator 14 exceeds that of the trim circuit 22 causing differential amplifier 24 to change its output polarity state with the change used to initiate the shutter close command 'CLS' with the film exposure interval being equal to the elapsed time between T=0 and $T=T_c$.

Figure 3B:
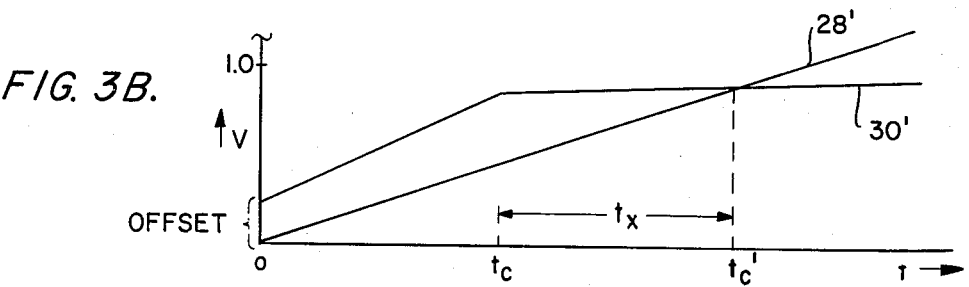
FIG. 3B is an idealized graphical illustration, similar to that of FIG. 3A, showing the response characteristics of the circuit of FIG. 2 and the photo-responsive array of FIG. 1 when the subjects of secondary interest in the foreground or the background portion of the scene are more brightly illuminated than the subject of principal interest in the central portion of the scene.

FIG. 3B represents the operation of the circuit of FIG. 2 and the photometric array 10 of FIG. 1 when the subject of principal interest in the central portion of the scene to be photographed is relatively darker than the subjects of secondary interest in either the background or foreground. Plot 28' represents the output of the integrator 14 and is substantially identical to the plot 28 discussed above in connection with FIG. 3A. Plot 30' represents the selected maximum of the output of the integrators 16 and 18 provided with an offset and limited to an arbitrarily selected upper limit by the trim circuit 22 as indicated by the horizontal portion of the plot 30'. When the shutter exposure interval is initiated at time T=0, the two plots 28' and 30' increase at different rates with increasing time. When the two plots 28' and 30', which represent the inputs to the differential amplifier 24, intersect at time $T=T'_c$, the change in output polarity of the differential amplifier is used to initiate the shutter close command 'CLS' on line 26.

A comparison of the positions of the $T_c$ and $T'_c$ intercepts between the uniform illumination of FIG. 3A and the more brightly illuminated background or foreground of FIG. 3B indicates that the total exposure interval from T=0 to $T=T'_c$ is extended by an amount approximately equal to $t_x$ which is adjusted to be approximately equivalent to plus one to plus one and one-half F stops.

By extending the film exposure interval by an amount approximately equal to $t_x$, the subject of primary interest in the central portion of the scene is properly exposed with correction having thus been made for the relatively brighter subjects of secondary interest in the background or foreground portions of the scene.

Figure 3C:
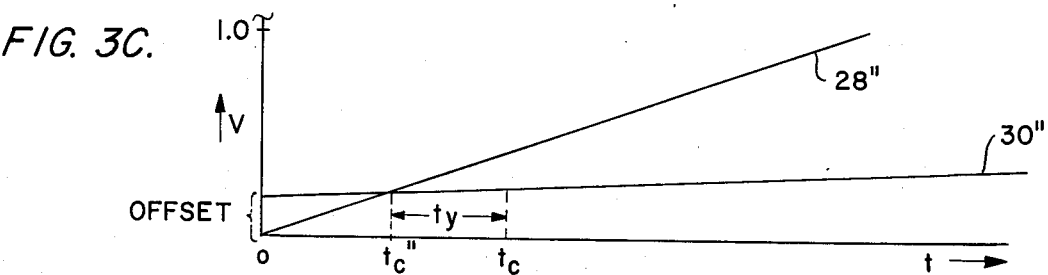
FIG. 3C is an idealized graphical illustration, similar to that of FIGS. 3A and 3B, showing the response characteristics of the circuit of FIG. 2 and the photo-responsive array of FIG. 1 when the subject of primary interest in the central portion of the scene is more brightly illuminated than the subjects of secondary interest in the foreground or background portion of the scene.

FIG. 3C represents the operation of the circuit of FIG. 2 and the photometric array 10 of FIG. 1 when the subject of principal interest in the central portion of the scene to be photographed is relatively brighter than the subjects of secondary interest in either the background or foreground portions. Plot 28" in FIG. 3C represents the output of the integrator 14 and is substantially identical to the plots 28 and 28' discussed above in connection with FIGS. 3A and 3B. Plot 30" represents the maximum of the output of the integrators 16 and 18 provided with an offset by the trim circuit 22. Because the subjects of secondary interest in the foreground and background are less brightly illuminated than in the examples of FIGS. 3A and 3B, the rate of increase with time of the plot 30" is correspondingly less and approaches the horizontal.

When the shutter exposure interval is initiated at time T=0, the two plots 28" and 30" increase at different rates with increasing time. When the two plots 28" and 30", which represent the inputs to the differential amplifier 24, intersect, the change in output polarity of the differential amplifier 24 is used to initiate the shutter close command 'CLS' on line 26 at time $T=T''_c$.

A comparison of the positions of the $T_c$ and $T''_c$ between the uniform illumination of FIG. 3A and the more brightly illuminated subject of principal interest of FIG. 3C indicates that the total exposure interval is decreased by an amount approximately equal to $t_y$ which is adjusted to be approximately the equivalent of minus one F stop.

By decreasing the film exposure interval by an amount approximately equal to $t_y$, the subject of primary interest in the central portion of the scene is properly exposed with exposure correction having been made for the relatively darker subjects of secondary interest in the background or foreground portions of the scene.

As can be appreciated, the photo array 10 operating in combination with the circuit of FIG. 2 can provide a shutter close command signal for an integrating type shutter so that the exposure interval is increased when the subject of primary interest in the central portion of the scene is less brightly illuminated than the foreground or background portions and decrease the exposure interval when the subject of primary interest in the central portions of the scene is more brightly illuminated than either the background or foreground portions.

Figure 4:
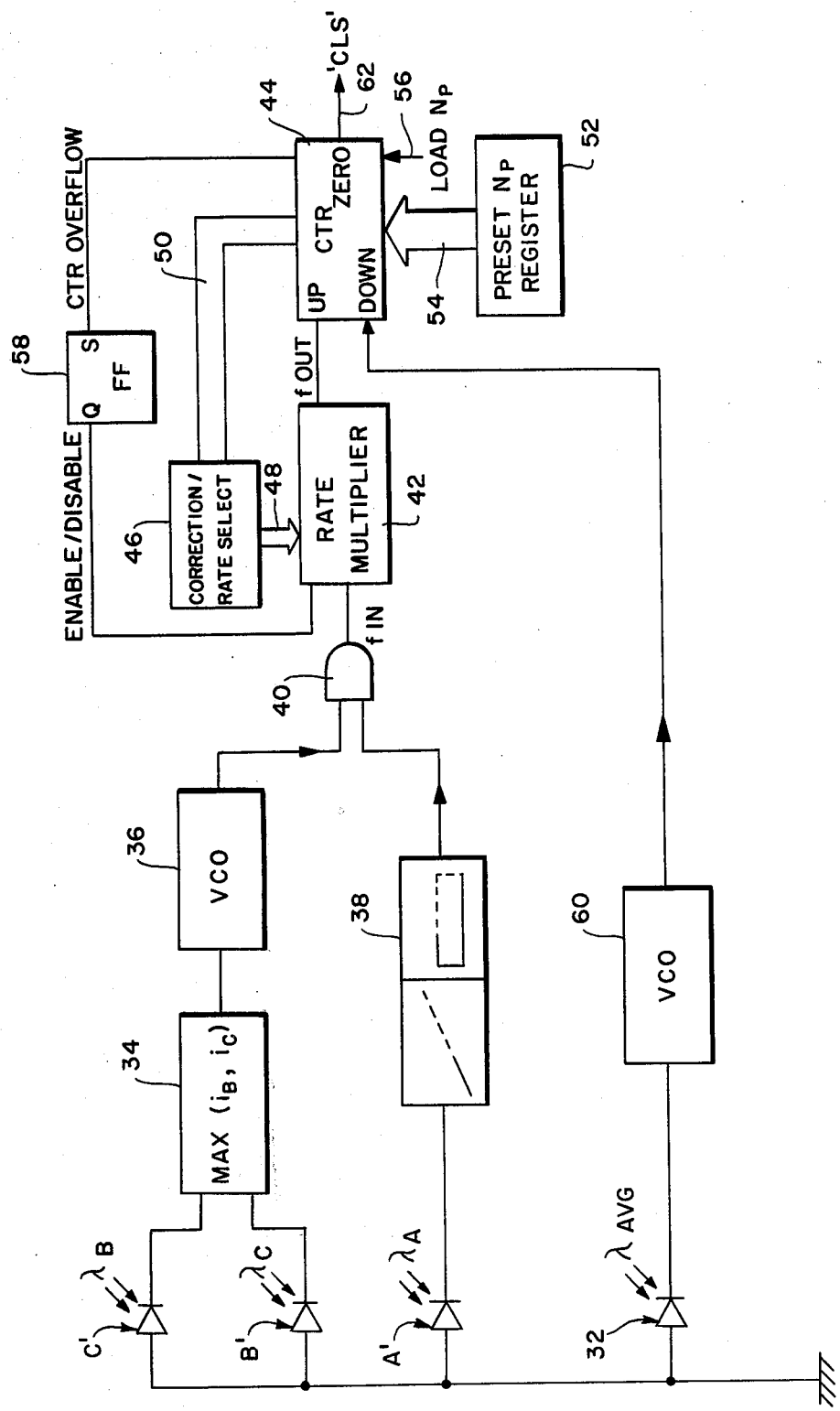
FIG. 4 is a schematic block diagram of an analog/digital circuit adapted to operate in cooperation with the photo-responsive array of FIG. 1 and the averaging photo cell of an integrating-shutter camera to determine the timing of a shutter close command signal.

FIG. 4 illustrates an analog/digital electronic circuit adapted to cooperate with the photometric array 10 of FIG. 1 in a camera that includes an integrating shutter and an averaging photo-responsive cell as disclosed in the aforementioned U.S. Pat. No. 4,008,481 to Whiteside.

In FIG. 4, the anodes of the photodiodes A', B', and C' and the averaging photo-responsive cell 32 of the camera are connected to a common circuit ground. The cathodes of the photodiodes B' and C' are connected to a selection circuit 34 that selects the maximum of the outputs of the photodiodes B' and C', that is, MAX[B, C]. The so-selected maximum output is connected to a voltage controlled oscillator 36 (VCO) that provides a recurring pulse output at a pulse repetition rate that is proportional to the output of the selection circuit 34.

The cathode of the photodiode A' is coupled to a combined time integrator/pulse generator 38 which integrates the output of the photodiode A' to a select voltage level and provides a control pulse output having a pulse width that is inversely proportional to the output of the photodiode A'. The output of the time integrator/pulse generator 38 and the voltage controlled oscillator 36 are coupled to a two-input AND gate 40 such that the output pulses from the voltage controlled oscillator 36 are gated in proportion to the width of the control pulse from the time integrator/pulse generator 38 into a rate multiplier 42. The input to the rate multiplier 42 is thus proportional to MAX[λB, λC]/λA. The rate multiplier 42, as is known in the art, counts the pulses from the gate 40 and provides output pulses at a rate which can be arbitrarily selected as some sub-division of the input pulses. The output of the rate multiplier 42 is coupled to the count-up input of a binary counter 44 such that each pulse output of the rate multiplier 42 increments the counter 44 by one count.

A rate/correction select block 46 is connected to the rate multiplier 42 through a bus 48 and to the counter 44 through a bus 50 to permit a select variation in the $F_{out}/F_{in}$ ratio of the rate multiplier 42 to provide the specific non-linear transfer functions as shown graphically in FIG. 5 as will be more fully described in the following discussion.

A preset register 52 is connected to the parallel load inputs of the counter 44 through a bus 54 and is adapted to contain a select count, $N_p$ which operates to limit the magnitude of exposure correction which can be provided by decreasing the exposure interval in a manner to be subsequently described. The count $N_p$ is loaded into the counter 44 from the preset register 52 in response to a 'LOAD' command at terminal 56 prior to the initiation of the film exposure interval.

An overflow flip-flop 58 is provided between the overflow output of the counter 44 and the enable/disable input of the rate multiplier 42. The flip-flop 58 disables the rate multiplier 42 when the binary contents of the counter 44 exceeds its maximum count capacity to limit the magnitude of the film exposure correction which can be provided by extending the film exposure interval in a manner to be subsequently described.

The output of the camera's averaging photocell 32, which represents the average brightness for the scene to be photographed, is connected to a voltage controlled oscillator 60 which provides output pulses at a pulse repetition rate that is proportional to the intensity of the light from the scene incident upon the averaging photocell 32. The output of the voltage controlled oscillator 60 is connected to the count-down input of the counter 44 such that each pulse output of the voltage controlled oscillator 60 decrements the counter by one count.

In operation, the averaging photocell 32 located behind the light measuring aperture of the camera's integrating shutter determines the pulse rate output of the voltage controlled oscillator 60 while the outputs of the photodiodes A', B', and C', determine a pulse correction factor to either decrease or increase the film exposure interval if the scene light intensity incident to either of the photodiodes B', C' differs from the scene light intensity incident to the photodiode A'. The operation of the circuit of FIG. 4 can be best seen by first considering the operation of the averaging photocell 32, its associated voltage controlled oscillator 60, the counter 44, and the preset register 52 to provide an uncorrected exposure interval under conditions where the scene light intensity incident to all the photodiodes A', B', and C' is substantially the same. When the exposure interval is initiated by operation of the shutter command button, the initial exposure count $N_p$ is loaded into the counter 44 from the preset register 52 through the bus 54. In addition, photodiodes A', B', and C' simultaneously provide output signals which are subsequently converted by the selection circuit 34, VCO 36, integrator/pulse generator 38, and gate 40 in the aforementioned manner to input the rate multiplier 42 and thus provide a nominal uncorrected pulse count to increment the counter 44 up by an additional number of select counts which for purposes of illustration may be the same number of counts ($N_p$) as the number of counts ($N_p$) provided by the preset register 52. The shutter blades subsequently begin to open to commence the exposure interval and light from the scene to be photographed impinges upon the averaging photocell 32, which, in turn, causes the voltage controlled oscillator 60 to generate pulses and thereby decrement the counter 44 from its total up count value ($2N_p$) toward zero with the rate of pulse generation and, consequently, the count-down rate being proportional to and determined by the light incident on the photocell 32. When the counter state passes through zero, the zero-indication terminal of the counter 44 changes its state to provide a shutter close command "CLS" along line 62 and terminate the film exposure interval. In this example, the film exposure interval is determined by the total uncorrected count-down time for the counter 44 and is dependent upon and inversely proportional to the light from the scene to be photographed incident upon the camera's averaging photocell 32 with the film exposure interval increasing with decreasing illuminance and, conversely, decreasing with increasing illuminance.

The exposure interval is affected, that is, either lengthened or shortened, by the number of pulses, either added or subtracted, from the nominal uncorrected pulse count ($N_p$) supplied by the rate multiplier 42 to the count-up input of the counter 44 and the pulse multiplier rate selected by the correction/select circuit 46. As previously discussed, the nominal uncorrected pulse count ($N_p$) provided to the counter 44 by the correction/rate select circuit 46 and the rate multiplier 42 in combination with the exposure preset count ($N_p$) provided by the register 52 represents an uncorrected film exposure interval where the scene light intensity incident to all the photodiodes A′, B′, and C′ is substantially the same. Correction pulses in excess of the nominal uncorrected number affect the film exposure interval by lengthening the count-down time of the counter 44 and thus lengthen the film exposure interval and correction pulses below the nominal uncorrected number affect the film exposure interval by decreasing the count-down time of the counter 44 and thus shorten the film exposure interval.

The exposure interval correction is determined by the difference in the magnitudes of the scene light intensity incident upon the photodiodes B′ or C′ and the photodiode A′ of the photo array 10. Upon actuation of the camera shutter button, the selection circuit 34 selects the maximum output of either the photodiode B′ or the photodiode C′. The so-selected output is introduced into the voltage controlled oscillator 36 which produces a pulse train having a pulse repetition rate that is directly proportional to the so-selected maximum output of the photodiodes B′ or C′. The output of the photodiode A′ is inputted to the combined integrator/pulse generator 38 which provides a pulse output having a pulse width that is inversely proportional to the scene light incident upon the photodiode A′ from the subject of principal interest in the central portion of the scene to be photographed. The pulse output of the integrator/pulse generator 38 is used as a control to gate the pulse output of the voltage controlled oscillator 36 through the AND gate 40 to the input of the rate multiplier 42. The output of the AND gate 40 is thus responsive to the quotient of the maximum of the illumination of B′ or C′ to the illumination of A′, that is, MAX (B′, C′)/A′. Therefore, if the scene light intensity incident to the photodiode A′ from the subject of principal interest in the central portion of the scene to be photographed is greater than the scene light intensity incident to the photodiodes B′, C′, there will be provided a reduction in the number of pulses supplied by the gate 40 to the multiplier 42 while conversely if the scene light intensity incident to the photodiode A′ from the subject of principal interest is less than the scene light intensity incident to the photodiodes B′, C′, there will be provided an increase in the number of pulses supplied by the gate 40 to the multiplier 42. The rate multiplier selects a sub-division of the pulse train output from the AND gate 40 in accordance with the rate select circuit 46 and outputs the rate-selected pulses to the count-up input of the counter 44.

When the exposure interval is initiated at the appropriate time subsequent to the actuation of the camera shutter button, the counter 44 begins to decrement in response to the pulses supplied by the voltage controlled oscillator 60 with the pulse repetition rate and the counter decrementing rate dependent upon the average illuminance incident on the camera's averaging photocell 32. Thus, while the counter 44 decrements in response to the output of the voltage controlled oscillator 60, the rate multiplier 42 provides corrected count-up pulses to either lengthen or decrease the total exposure interval in accordance with the difference in the relative brightnesses of the subject of principal interest as determined by the photodiode A′ of the photo array 10 and the subjects of secondary interest in the foreground and background portion of the scene to be photographed as determined by the photodiodes B′ and C′ of the photo array.

Figure 5:
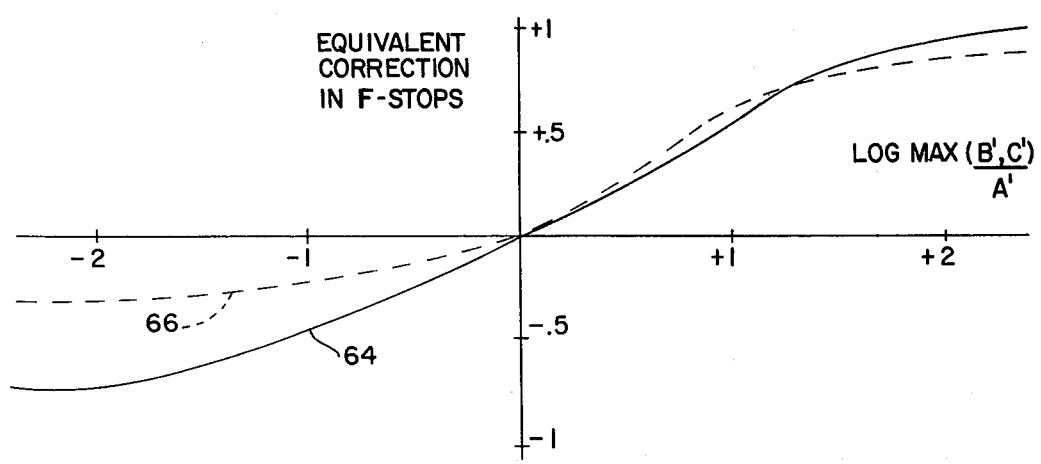
FIG. 5 is an idealized graphical illustration of exemplary response characteristics of the analog/digital circuit of FIG. 4 and the photo-responsive array of FIG. 1.

FIG. 5 graphically illustrates two exemplary response characteristics, identified by the reference characters 64, (solid line) and 66 (broken line), of the analog/digital circuit of FIG. 4 and the photo array 10 of FIG. 1 in which the ordinate represents the exposure correction in F stop equivalents and the abscissa represents the log of the aforementioned quotient MAX (B′C′)/A′. The origin of FIG. 5 represents the aforementioned nominal uncorrected pulse count ($N_p$) provided to the counter 44. When additional pulses above the origin value are provided to the counter 44 by the rate multiplier 42 above the nominal uncorrected number of pulses ($N_p$), the film exposure interval is lengthened to provide an effective increase in the equivalent F stop as indicated by the curves 64 and 66 in the first quadrant of FIG. 5, and, when the correction pulses supplied are less than the nominal uncorrected number of pulses ($N_p$), the film exposure interval is shortened to provide an effective decrease in the equivalent F stop as indicated by the curves 64 and 66 as shown in the third quadrant of FIG. 5.

Figure 6:
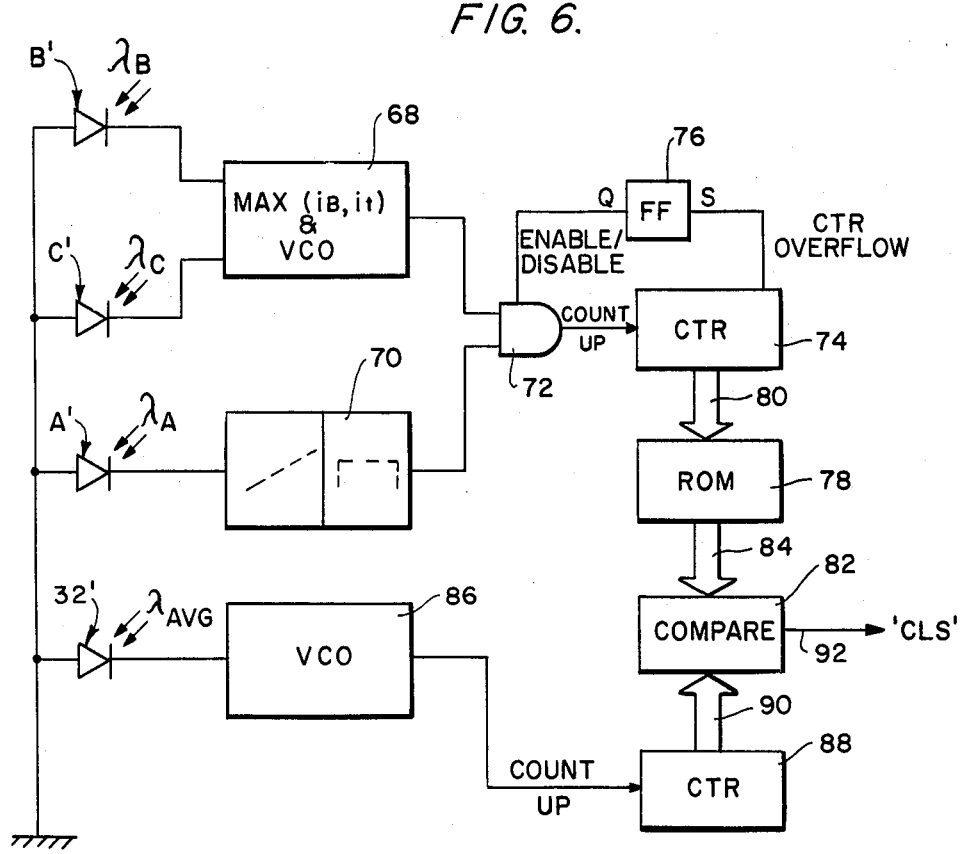
FIG. 6 is an analog/digital schematic block diagram of another embodiment of a film exposure interval determining circuit adapted to operate in combination with the photo-responsive array of FIG. 1.

FIG. 6 represents another embodiment of an analog/digital circuit suited for use with a camera having an integrating type shutter of the type described above. As shown therein, the electrical outputs of the photodiodes B′ and C′ of the photo array 10 are coupled to combined selection circuit and voltage controlled oscillator 68 that selects the maximum of the outputs of the photodiodes B′ and C′, that is, MAX (B, C), and provides a pulse output having a pulse repetition rate that is proportional to the so-selected signal. The output of the photodiode A′, which receives the illumination from the subject of primary interest in the central portion of the scene, is inputted to a combined integrator/pulse generator 70 which provides a pulse output having a pulse width that is inversely proportional to the output of the photodiode A' in a manner similar to that of the circuit 38 of FIG. 4. The output of the combined selection circuit and voltage control oscillator 68 and the output of the integrator/pulse generator 70 are inputted to an AND gate 72 which provides a pulse train of selected length to an incrementing counter 74 in a manner analogous to the gate 40 of FIG. 4. A flip-flop 76 is provided between the overflow output of the counter 74 and the AND gate 72 to disable the gate 72 when the counter 74 exceeds its maximum count capacity. The counter 74 is connected to a read-only-memory 78 (e.g., a ROM or PROM) through a bus 80 such that the count states of the counter 74 are adapted to sequentially address and access storage locations in the read-only-memory 78. The contents of the various storage locations on the read-only-memory 78 represent exposure correction values in binary form with the ROM connected to a comparator 82 through a bus 84.

The output of the camera's averaging photocell 32' (analogous to the photocell 32 of FIG. 4) is connected to a voltage controlled oscillator 84 which provide a pulse output to an incrementing counter 88 at a pulse repetition rate that is proportional to the average light incident from the scene to be photographed on the photocell 32'. The counter 88 is connected to the comparison circuit 82 through a bus 90. The comparison circuit 82 will issue a shutter close command "CLS" on line 92 when the count state in the counter 88 equals the count accessed from the storage location in the read-only-memory 78 addressed by the counter 74.

When the shutter command button is operated and the shutter blades commence exposure, the camera's averaging photocell 32' provides an output to its associated voltage controlled oscillator 86 which then provides pulses to the counter 88 at a rate which is directly proprotional to the average light reflected from the scene to be photographed. The counter 88 increments sequentially in response to the output from the voltage controlled oscillator 86 with the instantaneous count state supplied to the comparator 82 through the bus 90. The photodiodes A', B' and C' of the photo array 10 receive the light reflected from the central, background, and foreground portions of the scene with combined selection and voltage controlled oscillator circuit 68 selecting the maximum of the outputs of the photodiodes B' and C' and providing a pulse output to the AND gate 72 at a pulse repetition rate that is proportional to the so-selected photodiode output and consequently proportional to the brighter of the illuminance of the background and foreground portions of the scene. The output of the photodiode A' is coupled to the combined integrator/pulse generator 70 which provides a gate control pulse output to the AND gate 72 at a pulse width which is inversely proportional to the reflected light from the central portion of the scene received by the photodiode A'. The AND gate 72 provides a selected number of pulses to the counter 74 which is uniquely responsive to the illuminance of the brighter of the foreground and background portions of the scene and the central portion of the scene. The output pulses from the AND gate 72 are counted by the counter 74 with each count state used to address a unique memory location within the read-only-memory and access the stored memory contents which represents an exposure count, to the comparator 82 through the bus 84. When the count state in the counter 88 equals the correction count accessed from the uniquely addressed memory location, the comparator 82 issues a shutter close command "CLS" along line 92 to terminate the film exposure interval. As can be appreciated by those skilled in the art, the contents of the various memory locations can be selected to provide various continuous and discontinuous exposure correction functions to effectively lengthen the film exposure interval when the subject of primary interest is less brightly illuminated than the subjects of secondary interest in either foreground or background and the shortened film exposure interval when the subject of primary interest is more brightly illuminated than the subjects of secondary interest in the foreground or background portions of the scene.

In the various circuits described above, the circuit timing and control interconnects are provided in accordance with the particular circuit technologies used to fabricate the circuits as is known in the art. These technologies can include SSI, MSI, and LSI techniques and TTL and CMOS logic. An example of a rate multiplier which can be utilized with the circuit of FIG. 4 includes the Texas Instruments 7497.

In the preferred embodiment, the photometric array of FIG. 1 has been disclosed having segments A, B, and C that receive light from approximately 25, 37-½, and 37-½%, respectively, of the scene to be photographed. As can be appreciated by those skilled in the art, the respective areas subtended by the preferred photometric array 10 and their preferred geometric shape and orientation can be varied without departing from the scope of the invention.

Photometers in accordance with the present invention are suited for use as stand-alone exposure determining meters, in cameras in which the shutter speed and aperture are set prior to actuating the shutter command button, and in cameras utilizing time-integrating shutters.

The photometer is particularly suited for inexpensive cameras used by the less sophisticated photographer since the photometer will advantageously correct the film exposure for the subject of principal interest in the central portion of the scene in those scenes having a brighter background or foreground (e.g. bright-sky, beach scenes, and winter snow scenes) by lengthening the exposure to properly expose the subject and in those scenes having a dark background (e.g. subject of principal interest against a foilage background) by shortening the exposure. Since the electronic circuitry can be implemented in digital form using a memory having any desired exposure correction functions, complex lighting arrangements can be evaualted to provide accurate exposure determinations.

As will be apparent to those skilled in the art, various changes and modifications may be made to the photometer of the present invention without departing from the spirit and scope of the invention as recited in the appended claims and their legal equivalent.

What is claimed is:

1. A photometer for receiving light from a scene having a background portion, foreground portion, and a central portion and determining a film exposure interval for the scene, said photometer comprising:
   a photo-responsive means for receiving light from a scene, said photo-responsive means including a first photo-responsive portion adapted to receive the light reflected from the foreground portion of the scene and provide a first electrical output responsive thereto, a second photo-responsive portion adapted to receive the light reflected from the background portion of the scene and provide a second electrical output responsive thereto, and a third photo-responsive portion adapted to receive light reflected from the central portion of the scene and provide a third electrical output responsive thereto;

first electronic circuit means coupled to said first and said second photo-responsive portions for selecting a one of said first and said second photo-responsive portions, said selection determined by an electrical parameter of said first and said second electrical outputs;

second electronic circuit means coupled to said third photo-responsive portion and said first electronic circuit means for providing a film exposure indication responsive to said third electrical output and said so-selected electrical output of said first and said second electrical outputs, the film exposure indication being increased when the illuminance of the light incident on said so-selected photo-responsive portion as indicated by said so-selected electrical output exceeds the illuminance incident on said third photo-responsive portion as indicated by said third electrical output and the film exposure indication being decreased when the illuminance of the light incident on said third photo-responsive portion as indicated by said third electrical output exceeds the illuminance of the light incident on said so-selected photo-responsive portion as indicated by said so-selected electrical output.

2. The photometer claimed in claim 1, wherein said parameter for selecting one of said first and second electrical outputs is the magnitude of said outputs, the maximum of said first and said second electrical outputs being selected by said first electronic circuit.

3. The photometer claimed in claim 2 wherein
said photo-responsive means has a field of view substantially corresponding to the scene for which the film exposure indication determination is to be made;
said first and said second photo-responsive portions have fields of view subtending substantially equal areas of said scene; and
said third photo-responsive portion has a field of view subtending the remaining area of said scene.

4. The photometer claimed in claim 3 wherein said first and said second photo-responsive portions subtend approximately 37½% of said scene and said third photo-responsive portion subtends approximately 25% of said scene.

5. The photometer claimed in claim 3 wherein said photo-responsive means circumscribes a substantially rectangular area corresponding to the scene for which the film exposure determination is to be made, said third photo-responsive portion circumscribes a substantially rectangular area centrally located within the area circumscribed by said photo-responsive means with equal portions of said third photo-responsive portion extending on either side of a median line of said photo-responsive means, said first photo-responsive portion occupying the remaining area of said photo-responsive means on one side of the median line and said second photo-responsive portion occupying the remaining area of said photo-responsive means on the other side of said median line.

6. The photometer claimed in claim 5 wherein said first and said second photo-responsive portions circumscribe approximately 37½% of the area of said photo-responsive means and said third photo-responsive portion subtends approximately 25% of the area of said photo-responsive means.

7. The photometer claimed in claim 1, wherein said first, second, and third photo-responsive portions are defined by substantially planar photodiode junctions deposited on a unitary substrate.

8. The photometer claimed in claim 1 wherein said photo-responsive means circumscribes a substantially rectangular area corresponding to the scene for which the film exposure determination is to be made, said third photo-responsive portion circumscribes a substantially rectangular area centrally located within the area circumscribed by said photo-responsive means with equal portions of said third photo-responsive portion extending on either side of a median line of said photo-responsive means, said first photo-responsive portion occupying the remaining area of said photo-responsive means on one side of the median line and said second photo-responsive portion occupying the remaining area of said photo-responsive means on the other side of said median line.

9. A light-integrating photometer for receiving light from a scene having a background portion, a foreground portion, and a central portion and determining the duration of a film exposure interval for the scene, said photometer comprising:
a photo-responsive means for receiving a light from a scene, said photo-responsive means including a first photo-responsive portion adapted to receive the light reflected from the foreground portion of the scene and provide a first electrical signal responsive thereto, a second photo-responsive portion adapted to receive the light reflected from the background portion of the scene and provide a second electrical signal responsive thereto, and a third photo-responsive portion adapted to receive light reflected from the central portion of the scene and provide a third electrical signal responsive thereto;
first electronic circuit means coupled to said first and said second photo-responsive portions for selecting the maximum electrical output of said first and said second electrical signals and providing a time-integrated output of the so-selected signal;
second electronic circuit means coupled to said third portion of said photo-responsive means for providing a time-integrated output of said third electrical signal;
third electronic circuit means coupled to said first and second electronic circuit means for providing an indication signal that determines the duration of the film exposure interval when the outputs of said first and said second electronic circuit means correspond to a predetermined signal relationship.

10. The photometer claimed in claim 9, wherein correspondence with said predetermined signal relationship is achieved when said output of said second electronic circuit means exceeds that of said first electronic circuit means.

11. The photometer claimed in claim 10 wherein
said photo-responsive means has a field of view substantially corresponding to the scene for which the film exposure indication determination is to be made;
said first and said second photo-responsive portions have fields of view subtending substantially equal areas of said scene; and said third photo-responsive portions has a field of view subtending the remaining area of said scene.

12. The photometer claimed in claim 11 wherein said first and said second photo-responsive portions subtend approximately 37½% of said scene and said third photo-responsive portion subtends approximately 25% of said scene.

13. The photometer claimed in claim 11 wherein said photo-responsive means circumscribes a substantially rectangular area corresponding to the scene from which the film exposure determination is to be made, said third photo-responsive portion circumscribes a substantially rectangular area centrally located within the area circumscribed by said photo-responsive means with equal portions of said third photo-responsive portion extending on either side of a median line of said photo-responsive means, said first photo-responsive portion occupying the remaining area on one side of the median line and said second photo-responsive portion occupying the remaining area of said photo-responsive means on the other side of said median line.

14. The photometer claimed in claim 13 wherein said first and said second photo-responsive portions circumscribe approximately 37½% of the area of said photo-responsive means and the third photo-responsive portion subtends approximately 25% of the area of said photo-responsive means.

15. The photometer claimed in claim 10 wherein said third electronic circuit means comprises a differential amplifier having its inputs connected to said first and said second electronic circuit means to provide said indication signal when the output of said second electronic circuit means exceeds the output of said first electronic circuit means.

16. The photometer claimed in claim 15 wherein said first electronic circuit means comprises:
a comparator circuit means to select the maximum of the outputs of said first and second photo-responsive portions and an integrator circuit means connected to said comparator circuit means to time-integrate said so-selected maximum signal.

17. The photometer claimed in claim 9, wherein said first, second and third photo-responsive portions are defined by substantially planar photodiode junctions deposited on a unitary substrate.

18. An exposure control system for controlling the exposure interval of a photographic camera of the type having a shutter means that is adapted, upon initiation of a film exposure interval, to admit light from a scene to be photographed into the camera to expose photographic film within the camera and which is adapted to terminate the exposure interval in response to a shutter close command signal, said system comprising:
a photo-responsive means for receiving light from the scene to be photographed, said photo-responsive means including a first photo-responsive portion adapted to receive the light reflected from the foreground portion of the scene and provide a first electrical input responsive thereto, a second photo-responsive portion adapted to receive the light reflected from the background portion of the scene and provide a second electrical output responsive thereto, and a third photo-responsive portion adapted to receive light reflected from the central portion of the scene and provide a third electrical output responsive thereto;
first electronic circuit means coupled to said first and said second photo-responsive portions for selecting the maximum electrical output of said first and said second electrical outputs; and
second electronic circuit means coupled to said third photo-responsive portion and said first electronic circuit means for providing a shutter close command signal responsive to said third electrical output and said so-selected maximum electrical output of said first and said second electrical outputs, the exposure indication being increased when the illuminance of the light incident on said so-selected photo-responsive portion as indicated by said so-selected maximum electrical output exceeds the illuminance incident on said third photo-responsive portion as indicated by said third electrical output and the film exposure indication being decreased when the illuminance of the light incident on said third photo-responsive portion as indicated by said third electrical output exceeds the illuminance of the light incident on said so-selected photo-responsive portion as indicated by said so-selected maximum electrical output.

19. An exposure control system for controlling the exposure interval of a photographic camera of the type having an integrating shutter means that is adapted, upon initiation of a film exposure interval, to admit light from a scene to be photographed to a film plane in the camera and to a photometer in correspondence with the scene light admitted to the film plane, which shutter means is adapted to terminate the exposure interval in response to a shutter close command signal, said system comprising:
a photo-responsive means for receiving light from the scene to be photographed in correspondence with the scene light received by the camera photometer, said photo-responsive means including a first photo-responsive portion adapted to receive the light reflected from the foreground portion of the scene and provide a first electrical output responsive thereto, a second photo-responsive portion adapted to receive the light reflected from the background portion of the scene and provide a second electrical output responsive thereto, and a third photo-responsive portion adapted to receive light reflected from the central portion of the scene and provide a third electrical output responsive thereto;
first electronic circuit means coupled to said first and said second photo-responsive portions to select the maximum electrical output of said first and said second electrical outputs; and
second electronic circuit means coupled to said third photo-responsive portion and said first electronic circuit means to provide a shutter close command signal responsive to said third electrical output and said so-selected maximum electrical output of said first and said second electrical outputs, the exposure indication being increased when the illuminance of the light incident on said so-selected photo-responsive portion as indicated by said so-selected electrical output exceeds the illuminance incident on said third photo-responsive portion as indicated by said third electrical output and the film exposure indication being decreased when the illuminance of the light incident on said third photo-responsive portion as indicated by said third electrical output exceeds the illuminance of the light incident on said so-selected photo-responsive portion as indicated by said so-selected electrical output.

20. The photometer claimed in claims 18 or 19 wherein
said photo-responsive means has a field of view substantially corresponding to the scene for which the film exposure indication determination is to be made;
said first and said second photo-responsive portions have fields of view subtending substantially equal areas of said scene; and
said third photo-responsive portion has a field of view subtending the remaining area of said scene.

21. The photometer claimed in claim 20 wherein said first and said second photo-responsive portions subtend approximately 37½% of said scene and said third photo-responsive portion subtends approximately 25% of said scene.

22. The photometer claimed in claim 20 wherein said photo-responsive means circumscribes a substantially rectangular area corresponding to the scene for which the film exposure determination is to be made, said third photo-responsive portion circumscribes a substantially rectangular area centrally located within the area circumscribed by said photo-responsive means with equal portions of said third photo-responsive portion extending on either side of a median line of said photo-responsive means, said first photo-responsive portion occupying the remaining area of said photo-responsive means on one side of the median line and said second photo-responsive portion occupying the remaining area of said photo-responsive means on the other side of said median line.

23. The photometer claimed in claim 20 wherein said first and said second photo-responsive portions circumscribe approximately 37½% of the area of said photo-responsive means and said third photo-responsive portion subtends approximately 25% of the area of said photo-responsive means.

24. The photometer claimed in claims 18 or 19 wherein said first, second, and third photo-responsive portions are defined by substantially planar photodiode junctions deposited on a unitary substrate.

25. The photometer claimed in claims 18 or 19 wherein said photo-responsive means circumscribes a substantially rectangular area corresponding to the scene for which the film exposure determination is to be made, said third photo-responsive portion circumscribes a substantially rectangular area centrally located within the area circumscribed by said photo-responsive means with equal portions of said third photo-responsive portion extending on either side of a median line of said photo-responsive means, said first photo-responsive portion occupying the remaining area of said photo-responsive means on one side of the median line and said second photo-responsive portion occupying the remaining area of said photo-responsive means on the other side of said median line.

26. A photographic exposure control system for a photographic camera of a type having shutter means adapted, upon initiation of a film exposure interval, to admit light from a scene to be photographed to a film plane in the camera and to an averaging photo-responsive cell located to receive scene light in correspondence with the scene light admitted to the film plane, said exposure control system comprising:
a first photo-responsive means for receiving light from the foreground portion of the scene to be photographed and for providing a first output signal responsive to the light from the foreground portion;
a second photo-responsive means for providing and receiving light from the background portion of the scene to be photographed and for providing a second output signal responsive to the light from the background portion;
a third photo-responsive means for receiving light from the central portion of the scene to be photographed and for providing a third output signal responsive to the light from the central portion;
selector electronic circuit means coupled to said first and said second photo-responsive means for providing an output signal that is responsive to the maximum signal of said first and second signals; and
exposure interval determining circuit means for providing a corrected shutter close command signal to terminate the exposure interval, said exposure interval determining circuit means being coupled to said third photo-responsive means and said selector electronic circuit means for providing a shutter close command signal corrected in response to said third electrical output and said so-selected maximum electrical output of said first and said second electrical outputs, the corrected shutter close command signal causing an increase to the film exposure when the illuminance of the scene light incident on said so-selected photo-responsive means as indicated by said so-selected output signal exceeds the illuminance incident on said third photo-responsive means as indicated by said third output signal and a decrease to the film exposure when the illuminance of the scene light incident on said third photo-responsive means as indicated by said third output signal exceeds the illuminance of the light incident on said so-selected photo-responsive means as indicated by said so-selected output signal.

27. The exposure control system claimed in claim 26, wherein:
said first, second, and third photo-responsive means are arranged as a photo-responsive array having a field of view substantially corresponding to the scene for which the film exposure is to be made;
said first and said second photo-responsive means have fields of view subtending substantially equal areas of the scene; and
said third photo-responsive means has a field of view subtending the remaining area of the scene.

28. The exposure control system claimed in claim 27 wherein said first and said second photo-responsive means subtend approximately 37½% of said scene and said third photo-responsive means subtends approximately 25% of said scene.

29. The exposure control system claimed in claim 27 wherein said photo-responsive array circumscribes a substantially rectangular area corresponding to the scene for which the film exposure is to be made, said third photo-responsive means circumscribes a substantially rectangular area centrally located within the area circumscribed by said photo-responsive array with equal portions of said third photo-responsive means extending on either side of a median line of said photo-responsive array, said first photo-responsive means occupying the remaining area on one side of the median line and said second photo-responsive means occupying the remaining area of said photo-responsive array on the other side of said median line.

30. The exposure control system claimed in claim 29 wherein said first and said second photo-responsive means circumscribe approximately 37½% of the area of said photo-responsive array and the third photo-responsive means subtends approximately 25% of the area of said photo-responsive array.

31. The exposure control system claimed in claim 26 wherein said first, second and third photo-responsive means are defined by substantially planar photodiode junctions deposited on a unitary substrate.

32. The exposure control system claimed in claim 26 wherein said selector circuit means also includes means for providing a pulse output at a pulse repetition rate that is responsive to the maximum signal of said first and second signals and wherein said exposure interval determining circuit means includes:
- a pulse generating means coupled to the camera's averaging photocell for providing a pulse output at a pulse repetition rate that is responsive to the average illuminance of the light from the scene incident upon the camera's averaging photocell;
- a first counter coupled to said pulse generation means for counting said pulses provided in response to the camera's averaging photocell output;
- a second counter coupled to said selector electronic circuit means and adapted to count said pulses provided in response to said so-selected output signal;
- a memory means having a plurality of storage locations coupled to said second counter, said storage locations containing exposure interval information selectively addressed by the sequential states of said second counter; and
- comparator means coupled between said memory means and said first counter, said comparator means issuing a shutter close command when the counter state of said first counter equals the exposure interval information accessed from the storage locations in said memory means addressed by said second counter.

33. The exposure control system claimed in claim 26, wherein said selector circuit means also includes means for providing a pulse output at a pulse repetition rate that is responsive to the maximum signal of said first and second signal, and wherein said exposure interval determining circuit means includes:
- a pulse generating means coupled to the camera's averaging photocell for providing a pulsed output at a pulse repetition rate that is responsive to the average illuminance of the light from the scene incident upon the averaging photocell;
- a bi-directional counter coupled to said pulse generating means to count, in a first direction, said pulses provided in response to the light incident upon the camera's averaging photocell;
- electronic circuit means coupled to said third photo-responsive means for providing a pulse output having a pulse width that is inversely proportional to the illuminance of the incident light incident on said third photo-responsive means; and
- a gate coupled to said selector and said pulse width providing electronic circuit means for gating pulses from said selector electronic circuit means in response to said pulse output of said pulse width providing electronic circuit means to said counter to cause said counter to count, in a second direction, said gate pulses being corrected to affect the exposure interval, a shutter close command being issued when said counter counts to a predetermined value.

* * * * *